United States Patent
Onishi

(10) Patent No.: US 9,896,131 B2
(45) Date of Patent: Feb. 20, 2018

(54) VEHICLE FLOOR PORTION STRUCTURE

(71) Applicant: TOYOTA JIDOSHA KABUSHIKI KAISHA, Toyota-shi (JP)

(72) Inventor: Yoichiro Onishi, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/246,997

(22) Filed: Aug. 25, 2016

(65) Prior Publication Data

US 2017/0113729 A1    Apr. 27, 2017

(30) Foreign Application Priority Data

Oct. 22, 2015  (JP) .................................. 2015-208368

(51) Int. Cl.
  *B62D 25/20* (2006.01)
  *B62D 21/15* (2006.01)
  *B62D 25/02* (2006.01)

(52) U.S. Cl.
  CPC ......... *B62D 21/157* (2013.01); *B62D 25/025* (2013.01); *B62D 25/20* (2013.01); *B62D 25/2009* (2013.01); *B62D 25/2036* (2013.01)

(58) Field of Classification Search
  CPC ...... B62D 25/02; B62D 25/025; B62D 25/20; B62D 25/2009; B62D 25/2036; B62D 21/157
  See application file for complete search history.

(56) References Cited

U.S. PATENT DOCUMENTS

| | | | | |
|---|---|---|---|---|
| 4,514,008 A | * | 4/1985 | Watanabe | B60K 15/073 280/835 |
| 5,102,187 A | * | 4/1992 | Harasaki | B62D 25/2027 296/204 |

(Continued)

FOREIGN PATENT DOCUMENTS

| | | |
|---|---|---|
| JP | H02-121384 U | 10/1990 |
| JP | 2012-166710 | 9/2012 |
| JP | 2013-184569 | 9/2013 |

OTHER PUBLICATIONS

Office Action dated Dec. 5, 2017, in Japanese Patent Application No. 2015-208368 (with English language translation).

*Primary Examiner* — Gregory Blankenship
(74) *Attorney, Agent, or Firm* — Oblon, McClelland, Maier & Neustadt, L.L.P.

(57) ABSTRACT

A vehicle floor portion structure that includes: a pair of rockers extending in a vehicle front-and-rear direction; a tunnel extending in the vehicle front-and-rear direction, and the tunnel including a first upper wall portion, and a pair of first side wall portions; cross-members that link the rockers with the tunnel in the vehicle width direction; a tunnel upper reinforcement provided above the tunnel, the tunnel upper reinforcement partially overlapping with the cross-members in side view and being joined together with the cross-members; and a tunnel lower reinforcement disposed in the tunnel, a closed cross section portion being formed between the tunnel lower reinforcement and the first upper wall portion and the pair of first side wall portions, and the tunnel lower reinforcement overlapping with the cross-members in side view and being joined together with the cross-members.

6 Claims, 6 Drawing Sheets

(56) References Cited

U.S. PATENT DOCUMENTS

| | | | | |
|---|---|---|---|---|
| 5,127,704 | A * | 7/1992 | Komatsu | B62D 25/20 296/204 |
| 5,806,918 | A * | 9/1998 | Kanazawa | B62D 21/07 296/187.09 |
| 6,007,145 | A * | 12/1999 | Tezuka | B62D 25/20 296/203.01 |
| 6,039,386 | A * | 3/2000 | Hasshi | B62D 25/2036 296/193.07 |
| 6,382,710 | B1 * | 5/2002 | Funk | B62D 21/157 296/187.12 |
| 2002/0067053 | A1 * | 6/2002 | Wolkersdorfer | B62D 21/10 296/204 |
| 2007/0045034 | A1 * | 3/2007 | Kim | B62D 25/20 180/379 |
| 2008/0315629 | A1 * | 12/2008 | Abe | B62D 21/157 296/193.07 |
| 2010/0213741 | A1 * | 8/2010 | Suzuki | B60K 1/04 296/193.07 |
| 2012/0212009 | A1 * | 8/2012 | Ishizono | B62D 25/025 296/193.07 |
| 2013/0038090 | A1 * | 2/2013 | Hwang | B60R 13/0876 296/193.07 |
| 2015/0021894 | A1 * | 1/2015 | Moss | B62D 25/20 280/800 |
| 2015/0061323 | A1 * | 3/2015 | Otsuka | B62D 21/157 296/187.12 |
| 2016/0137228 | A1 * | 5/2016 | Atsumi | B62D 21/06 296/204 |
| 2016/0159402 | A1 * | 6/2016 | Nakaya | B62D 25/20 296/193.02 |
| 2016/0207572 | A1 * | 7/2016 | Natsume | B62D 25/20 |
| 2016/0339970 | A1 * | 11/2016 | Shibutake | B62D 35/005 |
| 2017/0015360 | A1 * | 1/2017 | Onishi | B62D 21/157 |
| 2017/0057549 | A1 * | 3/2017 | Saeki | B62D 25/2036 |
| 2017/0076629 | A1 * | 3/2017 | Kim | G09B 19/0015 |
| 2017/0080978 | A1 * | 3/2017 | Yoshida | B62D 21/155 |
| 2017/0106906 | A1 * | 4/2017 | Onishi | B62D 25/2009 |
| 2017/0113729 | A1 * | 4/2017 | Onishi | B62D 25/2009 |
| 2017/0120959 | A1 * | 5/2017 | Onishi | B62D 21/03 |

* cited by examiner

VEHICLE FLOOR PORTION STRUCTURE

CROSS-REFERENCE TO RELATED APPLICATION

This application is based on and claims priority under 35 USC 119 from Japanese Patent Application No. 2015-208368 filed on Oct. 22, 2015, the disclosure of which is incorporated by reference herein.

BACKGROUND

Technical Field

The present exemplary embodiments relates to a vehicle floor portion structure.

Related Art

Japanese Patent Application Laid-Open (JP-A) No. 2013-184569 discloses a structure in which a reinforcing member (a tunnel lower reinforcement) is provided in a tunnel portion (a tunnel) of a floor panel, at a vehicle front side of cross-members that span between the tunnel portion and rockers. The reinforcing member forms a closed cross section with the tunnel portion. JP-A No. 2012-166710 discloses a structure in which a reinforcing member (a tunnel upper reinforcement) is provided above a tunnel.

In these conventional technologies, because the reinforcing member is provided at the tunnel portion, when there is a side collision of the vehicle (hereinafter referred to using the term "during a side impact of the vehicle" as appropriate), a collision load transmitted from the tunnel portion to the reinforcing member is transmitted to the opposite side from the side at which the impact occurs.

However, in these conventional technologies, when a collision load is inputted to a cross-member during a side impact, stress is concentrated at a joining portion between the tunnel and the cross-member, and the collision load may not be transmitted to the reinforcing member efficiently.

SUMMARY

In consideration of the circumstances described above, an object of the present disclosure is to provide a vehicle floor portion structure that may reinforce a joining portion between a tunnel and a cross-member and efficiently transmit a collision load during a side impact to the opposite side from the side at which the impact occurs.

A vehicle floor portion structure according to a first aspect includes: a pair of rockers disposed at each of two outer sides in a vehicle width direction of a floor panel of a vehicle, the rockers extending in a vehicle front-and-rear direction; a tunnel disposed at a central portion in the vehicle width direction of the floor panel, the tunnel protruding to a vehicle cabin interior side and extending in the vehicle front-and-rear direction, and the tunnel including a first upper wall portion that structures a top portion, and a pair of first side wall portions that connect with the first upper wall portion and are disposed to oppose one another in the vehicle width direction; cross-members that link the rockers with the tunnel in the vehicle width direction; a tunnel upper reinforcement provided above the tunnel, the tunnel upper reinforcement partially overlapping with the cross-members in side view and being joined together with the cross-members; and a tunnel lower reinforcement disposed in the tunnel, a closed cross section portion being formed between the tunnel lower reinforcement and the first upper wall portion and the pair of first side wall portions, and the tunnel lower reinforcement overlapping with the cross-members in side view and being joined together with the cross-members.

In the vehicle floor portion structure according to the first aspect, each of the pair of rockers is arranged to extend in the vehicle front-and-rear direction at the respective outer side in the vehicle width direction of the floor panel of the vehicle. The tunnel that protrudes to the vehicle cabin interior side and extends in the vehicle front-and-rear direction is disposed at the vehicle width direction central portion of the floor panel. The first upper wall portion and the pair of first side wall portions are provided at the tunnel. The first upper wall portion structures the top portion of the tunnel. The pair of first side wall portions are disposed to oppose one another in the vehicle width direction and connect with the first upper wall portion. The rockers and the tunnel are linked in the vehicle width direction by the cross-members.

The tunnel upper reinforcement is provided above the tunnel. The tunnel upper reinforcement overlaps with each cross-member in side view and is joined together with the cross-member. The tunnel lower reinforcement is disposed in the tunnel. The tunnel lower reinforcement forms the closed cross section portion with the first upper wall portion and the pair of first side wall portions of the tunnel. The tunnel lower reinforcement overlaps with each cross-member in side view and is joined together with the cross-member.

Thus, because the closed cross section portion is formed between the tunnel lower reinforcement and the first upper wall portion and pair of first side wall portions of the tunnel, both stiffness of the tunnel lower reinforcement may be improved and stiffness of the tunnel may be improved.

In the present disclosure, the tunnel upper reinforcement and the tunnel lower reinforcement are each joined to the tunnel, and the tunnel upper reinforcement and the tunnel lower reinforcement respectively overlap with the cross-members in side view and are joined together with the cross-members. Therefore, joining strength at joining portions between the tunnel and the cross-members may be improved. Thus, the joining portions may be reinforced. Hence, during a side impact of the vehicle, a collision load transmitted from a rocker to a cross-member is transmitted to the tunnel upper reinforcement, the tunnel and the tunnel lower reinforcement, and is transmitted through these members to the opposite side from the side at which the impact occurs.

In a vehicle floor portion structure according to a second aspect, in the vehicle floor portion structure according to the first aspect, each cross-member includes a second upper wall portion that structures a top portion of the cross-member, and an upper flange portion that protrudes toward the upper side in a vehicle up-and-down direction from an end portion of the second upper wall portion at the side thereof at which the tunnel is disposed, second side wall portions structure portions of the tunnel upper reinforcement and abut against the first side wall portions of the tunnel from the outer sides of the tunnel in the tunnel width direction, and the upper flange portions overlap with the second side wall portions and the first side wall portions in side view and are joined together with the second side wall portions and the first side wall portions.

In the vehicle floor portion structure according to the second aspect, the second upper wall portion structuring the top portion of the cross-member is provided, and the upper flange portion protrudes toward the upper side in the vehicle up-and-down direction from the end portion of the second upper wall portion at the side thereof at which the tunnel is disposed. The second side wall portions are provided at the tunnel upper reinforcement. Each second side wall portion abuts against one of the first side wall portions of the tunnel from the outer side of the tunnel in the vehicle width direction. Each upper flange portion overlaps with the second side wall portion of the tunnel upper reinforcement and the first side wall portion of the tunnel in side view, and the upper flange portion is joined together with the second side wall portion and the first side wall portion.

In a vehicle floor portion structure according to a third aspect, in the vehicle floor portion structure according to the second aspect, the each cross-member further includes: a first front wall portion that connects with the second upper wall portion and is disposed at the front side of the second upper wall portion in the vehicle front-and-rear direction; a first front flange portion protruding toward the front side in the vehicle front-and-rear direction from an end portion of the first front wall portion at the side thereof at which the tunnel is disposed; a first rear wall portion that connects with the second upper wall portion and is disposed at the rear side of the second upper wall portion in the vehicle front-and-rear direction; and a first rear flange portion protruding toward the rear side in the vehicle front-and-rear direction from an end portion of the first rear wall portion at the side thereof at which the tunnel is disposed, the tunnel lower reinforcement includes: a third upper wall portion that structures a top portion of the tunnel lower reinforcement and is disposed at the lower side in the vehicle up-and-down direction of the first upper wall portion of the tunnel; a pair of third side wall portions that connect with the third upper wall portion and are disposed at respective inner sides in the vehicle width direction of the first side wall portions of the tunnel; a front upright wall portion provided at front end portions in the vehicle front-and-rear direction of the pair of third side wall portions; second front flange portions that are formed at the third side wall portions via the front upright wall portion, each second front flange portion protruding toward the front side in the vehicle front-and-rear direction; a rear upright wall portion provided at rear end portions in the vehicle front-and-rear direction of the pair of third side wall portions; and second rear flange portions that are formed at the third side wall portions via the rear upright wall portion, each second rear flange portion protruding toward the rear side in the vehicle front-and-rear direction, the first front flange portions overlap with the first side wall portions and the second front flange portions in side view and are joined together with the first side wall portions and the second front flange portions, and the first rear flange portions overlap with the first side wall portions and the second rear flange portions in side view and are joined together with the first side wall portions and the second rear flange portions.

In the vehicle floor portion structure according to the third aspect, each first front wall portion is provided at the front side of the cross-member in the vehicle front-and-rear direction. The first front flange portion protrudes towards the front side in the vehicle front-and-rear direction from the end portion of the first front wall portion at the side thereof at which the tunnel is disposed. Each first rear wall portion is provided at the rear side of the cross-member in the vehicle front-and-rear direction. The first rear flange portion protrudes toward the vehicle rear side in the vehicle front-and-rear direction from the end portion of the first rear wall portion at the side thereof at which the tunnel is disposed.

The third upper wall portion and the pair of third side wall portions are provided at the tunnel lower reinforcement. The third upper wall portion structures the top portion of the tunnel lower reinforcement and is disposed at the lower side in the vehicle up-and-down direction of the first upper wall portion of the tunnel. Each third side wall portion connects with the third upper wall portion and is disposed at the inner side of the tunnel in the vehicle width direction. The front upright wall portion is provided at the front end portions in the vehicle front-and-rear direction of the third side wall portions. The second front flange portions protrude toward the front side in the vehicle front-and-rear direction with the front upright wall portion connecting the third side wall portions with the second front flange portions. The rear upright wall portion is provided at the rear end portions in the vehicle front-and-rear direction of the pair of third side wall portions. The second rear flange portions protrude toward the rear side in the vehicle front-and-rear direction with the rear upright wall portion connecting the third side wall portions with the second rear flange portions.

The first front flange portion of each cross-member overlaps with the first side wall portion of the tunnel and the second front flange portion of the tunnel lower reinforcement in side view, and is joined together with the first side wall portion and the second front flange portion. The first rear flange portion of each cross-member overlaps with the first side wall portion of the tunnel and the second rear flange portion of the tunnel lower reinforcement in side view, and is joined together with the first side wall portion and the second rear flange portion.

As described above, the vehicle floor portion structure according to the present disclosure has excellent effects in that joining portions between a tunnel and cross-members may be reinforced and a collision load during a side impact may be efficiently transmitted to the opposite side from the side at which the impact occurs.

BRIEF DESCRIPTION OF THE DRAWINGS

Exemplary embodiments of the present disclosure will be described in detail based on the following figures, wherein.

DETAILED DESCRIPTION

Figure 1:
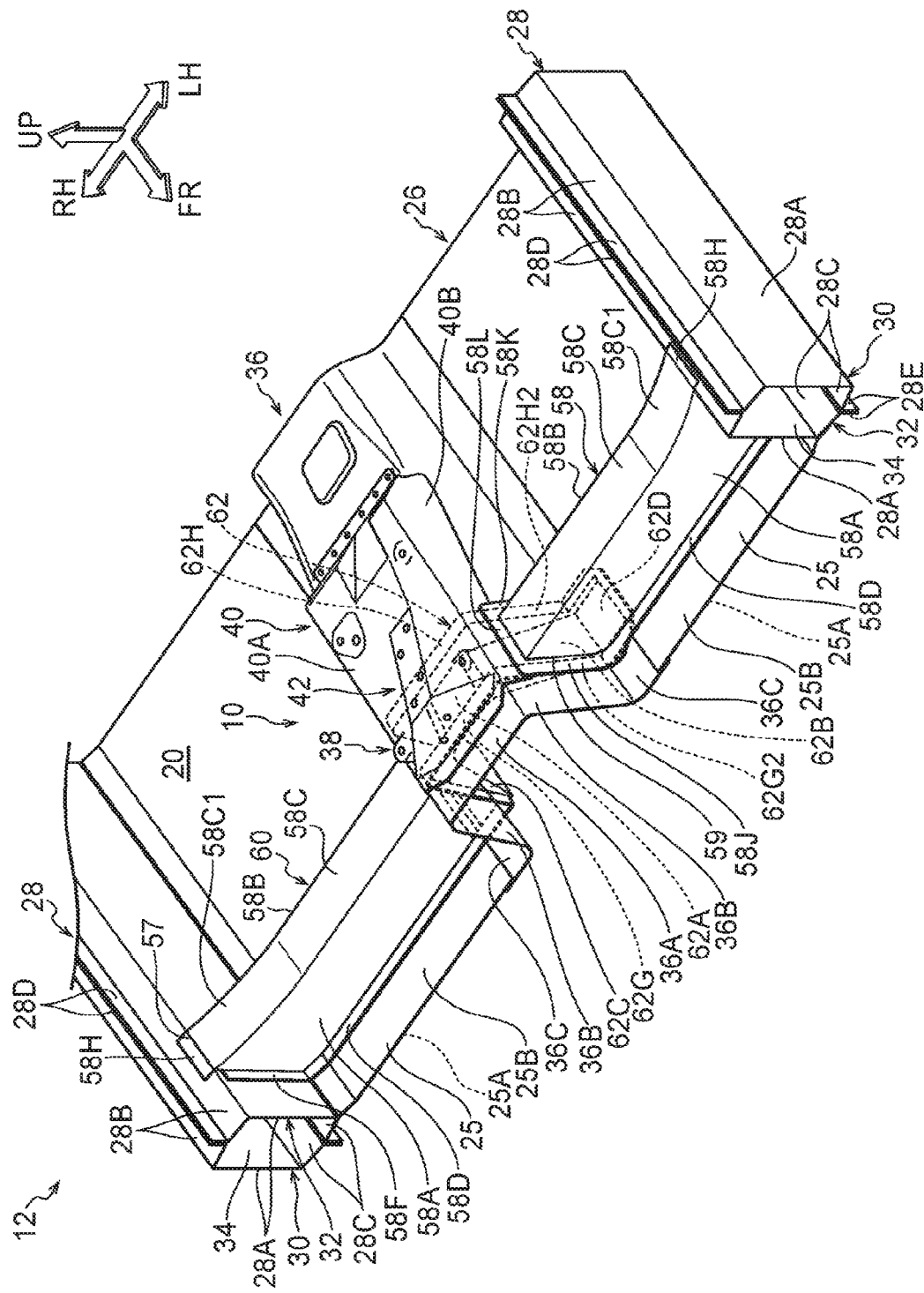
FIG. 1 is a perspective view showing a vehicle floor portion structure in accordance with a present exemplary embodiment.

A vehicle floor portion structure according to an exemplary embodiment of the present disclosure is described in accordance with the drawings. The arrow FR, arrow UP, arrow RH and arrow LH that are shown where appropriate in the drawings indicate, respectively, a front direction, an up direction, a right direction and a left direction of a vehicle in which the vehicle floor portion structure according to the exemplary embodiment of the present disclosure is employed. Herebelow, where descriptions are given simply using the directions front, rear, up, down, left and right, unless otherwise specified, these represent the front and rear in the vehicle front-and-rear direction, up and down in the vehicle up-and-down direction, and left and right when facing forward.

—Structures of the Vehicle Floor Portion Structure—

First, structures of the vehicle floor portion structure according to the present exemplary embodiment are described.

Figure 3:
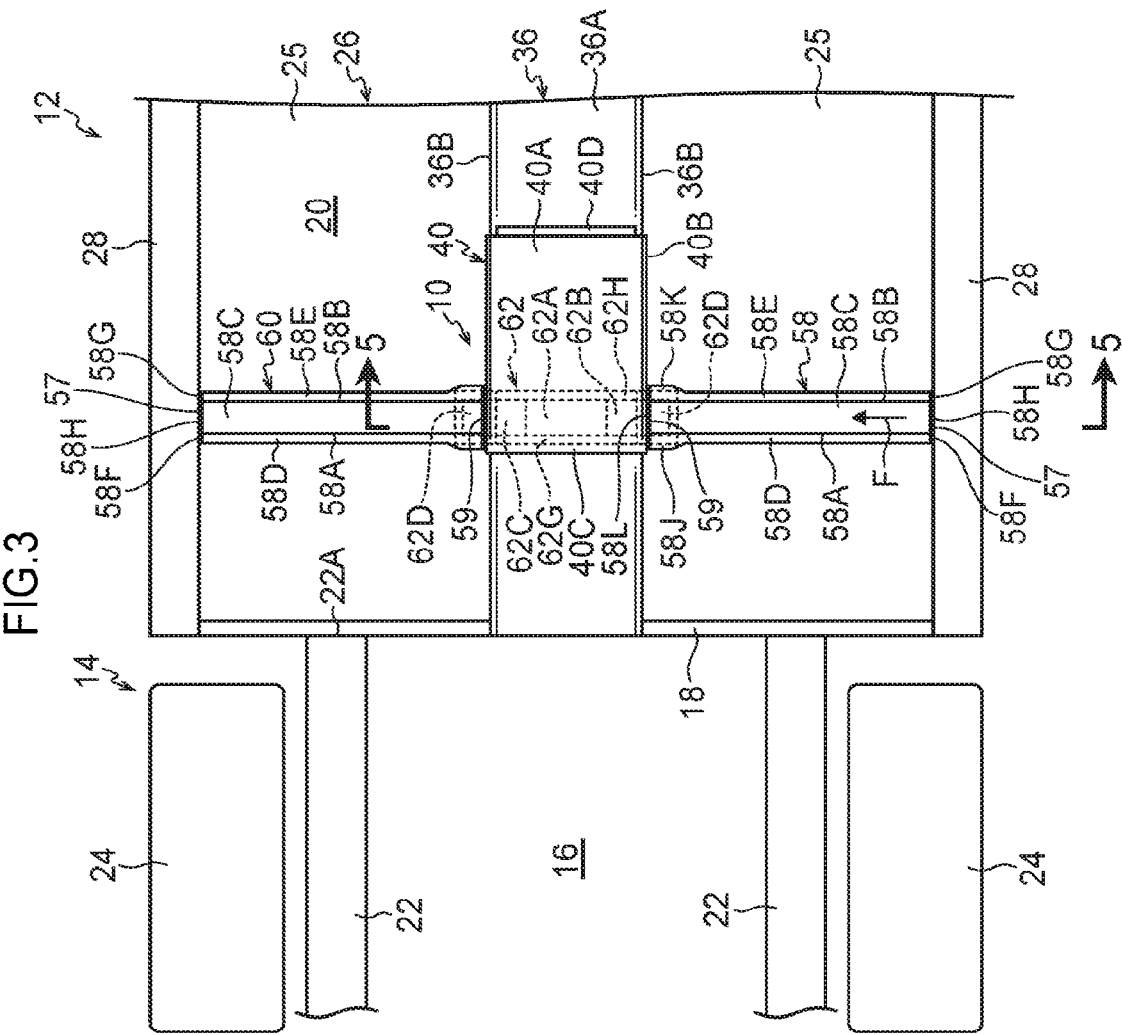
FIG. 3 is a plan view showing the vehicle floor portion structure in accordance with the present exemplary embodiment.

FIG. 3 shows a vehicle (vehicle body) 12 in which a vehicle floor portion structure 10 according to the present exemplary embodiment is employed. Commonly, a power unit compartment 16 is provided at a vehicle front portion 14 of the vehicle 12. The power unit compartment 16 is partitioned from a vehicle cabin 20 by a dash panel 18. A pair of front side members 22 are disposed at outer sides in the vehicle width direction of the power unit compartment 16. Tires 24 are disposed at the respective outer sides in the vehicle width direction of the front side members 22. Each of the front side members 22 extends in the vehicle front-and-rear direction, and a rear end portion 22A of each front side member 22 is joined to the dash panel 18 by welding or the like.

Although not shown in the drawings, a front end portion of a floor panel 26 that structures a floor portion of the vehicle cabin 20 is joined to a lower end portion of the dash panel 18. Thus, the dash panel 18 and the floor panel 26 are made integral. In the present exemplary embodiment, joining is implemented by, for example, welding by spot welding or the like. The dash panel 18 and the floor panel 26 may be integrally formed.

A pair of rockers 28 extend in the vehicle front-and-rear direction at each of two vehicle width direction outer sides of the floor panel 26. As shown in FIG. 1, each rocker 28 includes a rocker outer panel 30, which is disposed at the vehicle width direction outer side, and a rocker inner panel 32, which is disposed at the vehicle width direction inner side.

The rocker outer panel 30 and the rocker inner panel 32 are each provided with a side wall portion 28A arranged in the vehicle up-and-down direction, an upper wall portion 28B arranged in the vehicle width direction at the upper end of the side wall portion 28A, and a lower wall portion 28C arranged in the vehicle width direction at the lower end of the side wall portion 28A. An upper flange portion 28D projects toward the upper side from the upper wall portion 28B, and a lower flange portion 28E projects toward the lower side from the lower wall portion 28C. The upper flange portions 28D are joined to one another and the lower flange portions 28E are joined to one another. Thus, a closed cross section portion 34 that extends in the vehicle front-and-rear direction is formed in the rocker 28.

The floor panel 26 is divided between left and right by a tunnel 36, which is described below, thus, the floor panel 26 is structured by a pair of floor panels 25. The tunnel 36 extends in the vehicle front-and-rear direction at a vehicle width direction central portion of the floor panel 26 (between the floor panel 25 at the left side and the floor panel 25 at the right side). A cross-sectional shape of the tunnel 36 cut along the vehicle width direction is formed substantially in a hat shape that opens to the lower side. The tunnel 36 is provided with an upper wall portion 36A (a first upper wall portion), which structures a top portion, and a pair of side wall portions 36B (first side wall portions), which are disposed to oppose one another at left and right of the upper wall portion 36A.

The pair of side wall portions 36B are formed as angled wall portions from the respective vehicle width direction outer ends of the upper wall portion 36A, being angled to the respective outer sides in the vehicle width direction towards the lower side. A pair of outer flange portions 36C protrude from lower ends of the pair of side wall portions 36B. The outer flange portions 36C are inflected to the respective vehicle width direction outer sides of the tunnel 36.

Each outer flange portion 36C is joined to a lower face 25A of the respective floor panel 25. Thus, the floor panels 25 and the tunnel 36 are made integral. The floor panels 25 and the tunnel 36 may be integrally formed.

Figure 2:
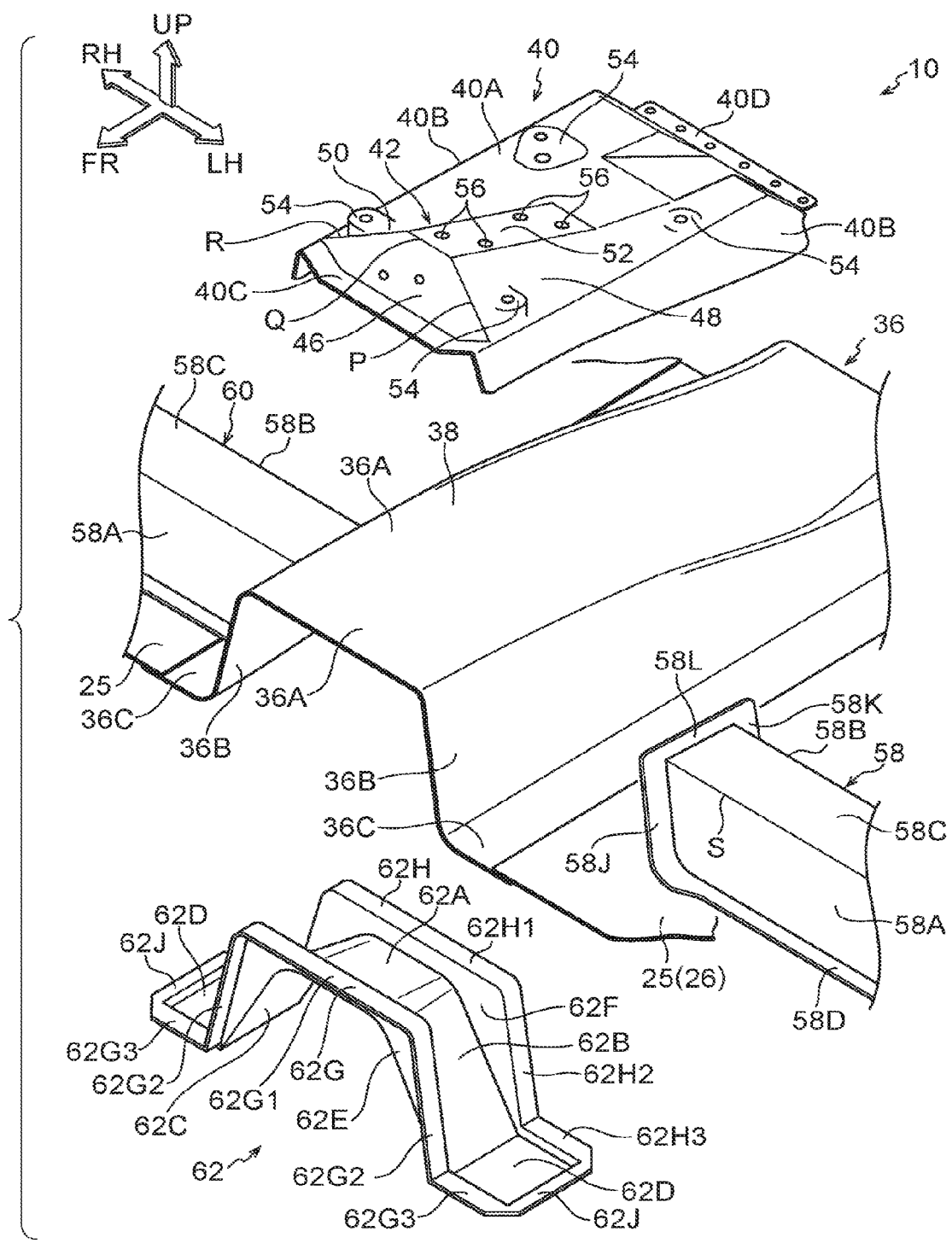
FIG. 2 is an exploded perspective view showing principal portions of the vehicle floor portion structure in accordance with the present exemplary embodiment.

A tunnel upper reinforcement 40 is joined to a front portion 38 of the tunnel 36. As shown in FIG. 2, a cross-sectional shape of the tunnel upper reinforcement 40 cut along the vehicle width direction is a substantial "U" shape that is open to the lower side. The tunnel upper reinforcement 40 is provided with an upper wall portion 40A that structures a top portion and a pair of side wall portions 40B (second side wall portions) that are disposed to left and right of the upper wall portion 40A.

The upper wall portion 40A of the tunnel upper reinforcement 40 covers the upper wall portion 36A at the front portion 38 of the tunnel 36, and the side wall portions 40B of the tunnel upper reinforcement 40 are joined to the respective side wall portions 36B of the tunnel 36. A bulge portion 42 that bulges toward the upper side is formed at a central portion of a front portion side of the upper wall portion 40A of the tunnel upper reinforcement 40. Thus, a closed cross section 44 (see FIG. 5) is formed between the bulge portion 42 and the upper wall portion 36A of the tunnel 36.

The bulge portion 42 includes an inclined wall 46, a left inclined wall 48, a right inclined wall 50, and an inclined wall 52. The inclined wall 46 is angled towards the vehicle rear side toward the upper side thereof. The left inclined wall 48 and the right inclined wall 50 are each angled toward the central side of the upper wall portion 40A in the vehicle width direction towards the upper sides thereof. The inclined wall 52 is disposed between the left inclined wall 48 and the right inclined wall 50 and is angled toward the lower side toward the vehicle rear side thereof. Thus, a ridgeline P is formed between the inclined wall 46 and the left inclined wall 48, a ridgeline Q is formed between the inclined wall 46 and the inclined wall 52, and a ridgeline R is formed between the inclined wall 46 and the right inclined wall 50. The ridgeline P, ridgeline Q and ridgeline R are continuous along the vehicle width direction.

A front flange portion 40C protrudes toward the front side from the front end of the upper wall portion 40A of the tunnel upper reinforcement 40, and a rear flange portion 40D protrudes toward the rear side from the rear end of the upper wall portion 40A. The tunnel upper reinforcement 40 abuts against the tunnel 36 from the upper side thereof. The front flange portion 40C and the rear flange portion 40D are each joined to the upper wall portion 36A of the tunnel 36. The side wall portions 40B are joined to the side wall portions 36B of the tunnel 36 at respective joining portions 41 and 45 (see FIG. 4).

Plural seat portions 54 and mounting holes 56 are formed at the upper wall portion 40A of the tunnel upper reinforcement 40. A parking brake, which is not shown in the drawings, is mounted at the mounting holes 56. A tunnel box, which is not shown in the drawings, is fixed to the seat portions 54. The tunnel box is interposed between the parking brake and the tunnel upper reinforcement 40.

As shown in FIG. 1, cross-members 58 and 60 are respectively arranged along the vehicle width direction at upper faces 25B of the floor panels 25, sandwiching the tunnel 36. The cross-member 58 and the cross-member 60 have similar structures. Accordingly, the cross-member 58 is described below and descriptions of the cross-member 60 are omitted. However, there are cases in which it is easier to view the side at which the cross-member 60 is disposed in the drawings. Accordingly, the cross-member 60 is depicted with reference symbols for specific portions that are the same reference symbols as for the cross-member 58.

The cross-member 58 spans between the tunnel 36 and the rocker 28 along the vehicle width direction. A plural number of the cross-member 58 are arranged spaced apart in the vehicle front-and-rear direction (one is shown in the drawings). The cross-member 58 is disposed at a location that partially overlaps with each side wall portion 40B of the tunnel upper reinforcement 40 in side view. A cross-sectional shape of the cross-member 58 cut along the vehicle front-and-rear direction is formed in a substantial hat shape that opens to the lower side.

To describe this more specifically, as shown in FIG. 2 and FIG. 3, the cross-member 58 includes a front wall portion 58A, a rear wall portion 58B and an upper wall portion 58C (a second upper wall portion). The front wall portion 58A is disposed at a front portion of the cross-member 58 and arranged along the vehicle width direction. The rear wall portion 58B is disposed at a rear portion of the cross-member 58, opposing the front wall portion 58A. The upper wall portion 58C connects the front wall portion 58A with the rear wall portion 58B and structures a top portion of the cross-member 58. The cross-member 58 is disposed such that a ridgeline S formed between the upper wall portion 58C and the front wall portion 58A is disposed at substantially the same position in the vehicle front-and-rear direction as the ridgeline P that is formed at the upper wall portion 40A of the tunnel upper reinforcement 40.

A front flange portion 58D protrudes from the lower end of the front wall portion 58A. The front flange portion 58D is inflected toward the front side. A rear flange portion 58E protrudes from the lower end of the rear wall portion 58B. The rear flange portion 58E is inflected toward the rear side. The front flange portion 58D and the rear flange portion 58E are each joined to the upper face 25B of the floor panel 25. Thus, a closed cross section portion 61 (see FIG. 5) is formed between the cross-member 58 and the floor panel 25.

A front flange portion 58F protrudes from an end portion 57 of the cross-member 58 at the side thereof at which the rocker 28 is disposed. The front flange portion 58F inflects toward the front side from an outer end of the front wall portion 58A and connects with the front flange portion 58D. A rear flange portion 58G protrudes from an outer end of the rear wall portion 58B. The rear flange portion 58G inflects toward the rear side and connects with the rear flange portion 58E. The front flange portion 58F and the rear flange portion 58G are joined to the side wall portion 28A of the rocker 28. An outer flange portion 58H projects toward the outer side in the vehicle width direction from an outer end of the upper wall portion 58C. The outer flange portion 58H is joined to the upper wall portion 28B of the rocker 28.

An inflected wall 58C1 is formed at the upper wall portion 58C, at the side of the cross-member 58 at which the rocker 28 is disposed. The inflected wall 58C1 is specified such that the height of the cross-member 58 gradually rises toward the side at which the rocker 28 is disposed. Therefore, a height of the closed cross section portion 61 is greater at the side of the upper wall portion 58C at which the rocker 28 is disposed.

A front flange portion 58J protrudes from an end portion 59 of the cross-member 58 at the side thereof at which the tunnel 36 is disposed. The front flange portion 58J inflects toward the front side from an outer end of the front wall portion 58A and connects with the front flange portion 58D. A rear flange portion 58K protrudes from an outer end of the rear wall portion 58B. The rear flange portion 58K inflects toward the rear side and connects with the rear flange portion 58E.

Figure 4:
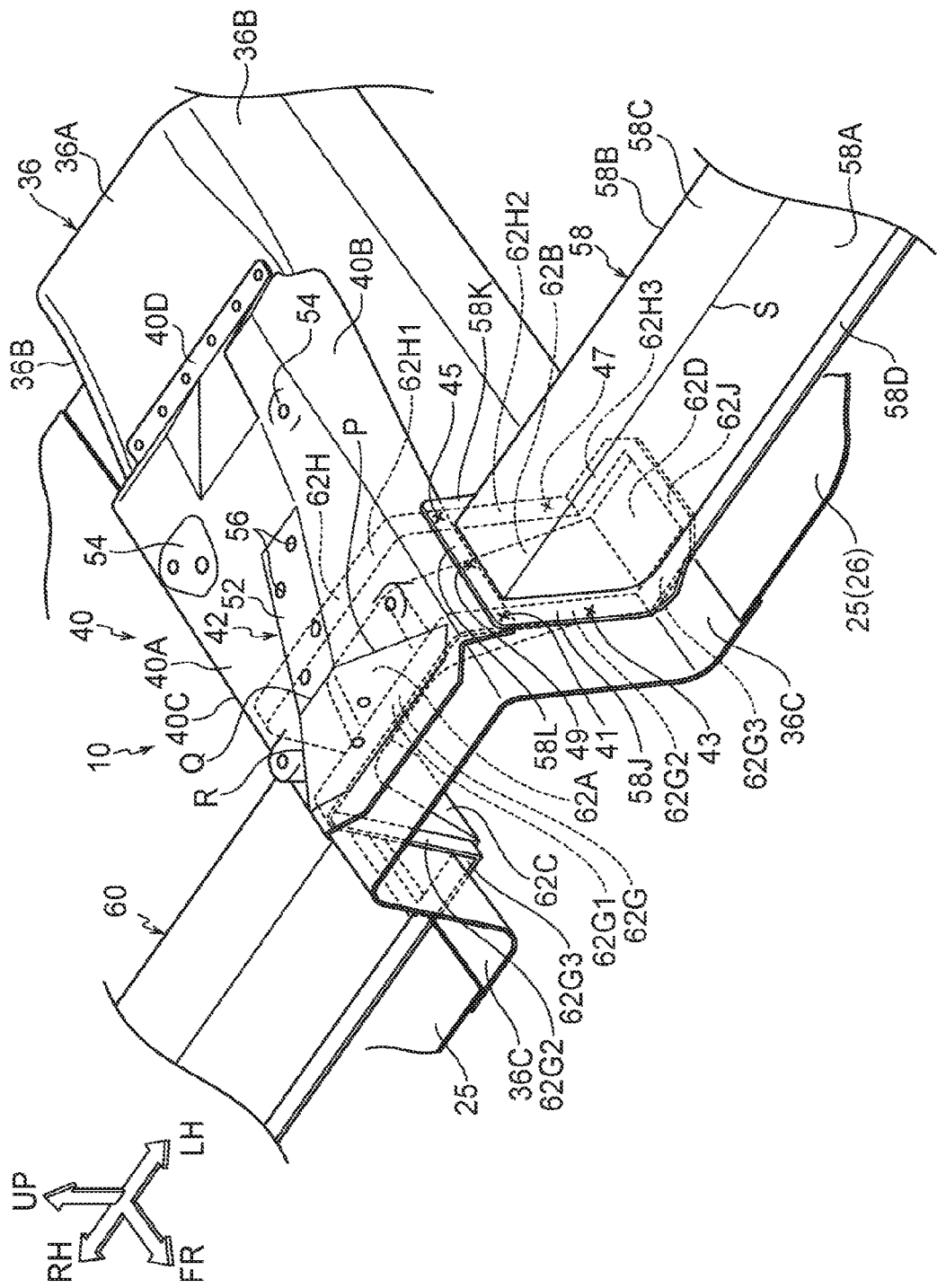
FIG. 4 is an enlarged perspective view showing the principal portions of the vehicle floor portion structure in accordance with the present exemplary embodiment.

The front flange portion 58J of the cross-member 58 is joined to the side wall portion 36B of the tunnel 36 at a joining portion 43 (see FIG. 4). The rear flange portion 58K of the cross-member 58 is joined to the side wall portion 36B of the tunnel 36 at a joining portion 47 (see FIG. 4). An upper flange portion 58L protrudes toward the upper side from an outer end of the upper wall portion 58C of the cross-member 58. The upper flange portion 58L is joined to the side wall portion 40B of the tunnel upper reinforcement 40 at the joining portions 41 and 45 (see FIG. 4).

Figure 5:
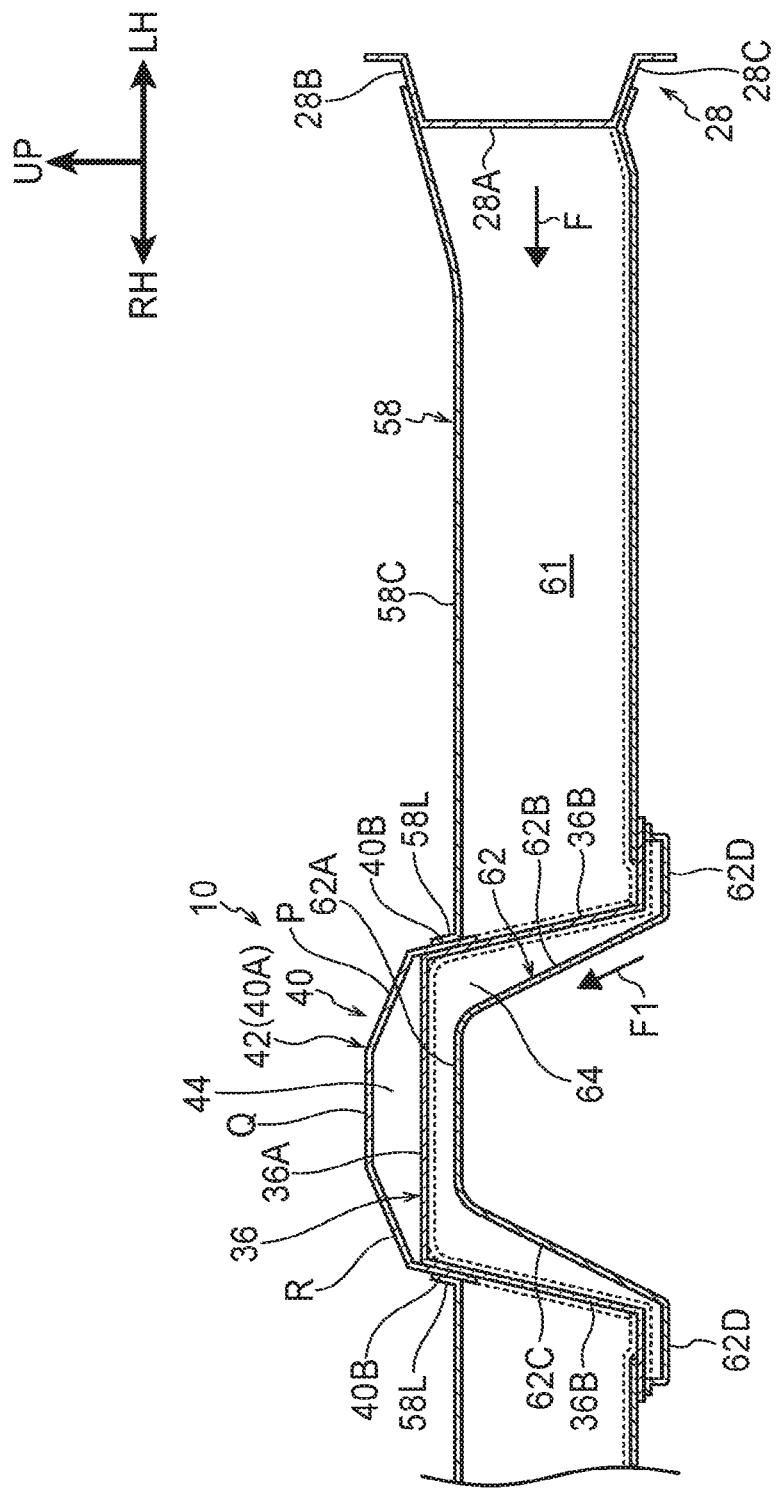
FIG. 5 is a sectional diagram cut along line 5-5 in FIG. 3.

In the present exemplary embodiment, as shown in FIG. 1 and FIG. 4, a tunnel lower reinforcement 62 is disposed inside the tunnel 36 at a location that overlaps with the cross-members 58 in side view. To describe this in specific terms, as shown in FIG. 2 and FIG. 5, the tunnel lower reinforcement 62 is formed in a substantial hat shape that opens to the lower side in front view.

As shown in FIG. 2, the tunnel lower reinforcement 62 includes an upper wall portion 62A and a pair of side wall portions 62B and 62C. The upper wall portion 62A opposes the upper wall portion 36A of the tunnel 36 and structures a top portion of the tunnel lower reinforcement 62. The pair of side wall portions 62B and 62C oppose the respective side wall portions 36B of the tunnel 36. The pair of side wall portions 62B and 62C are angled relative to one another towards the central side in the vehicle width direction of the tunnel lower reinforcement 62 towards the upper sides thereof. Corner portions between the upper wall portion 62A and the side wall portion 62B and between the upper wall portion 62A and the side wall portion 62C are formed to have radiuses of curvature small enough to avoid interference with an exhaust pipe, which is not shown in the drawings.

A pair of outer flange portions 62D protrude from the respective lower ends of the pair of side wall portions 62B and 62C. The outer flange portions 62D inflect towards the respective outer sides of the tunnel lower reinforcement 62 in the vehicle width direction. A front upright wall portion 62E protrudes from front ends of the upper wall portion 62A, the pair of side wall portions 62B and 62C and the pair of outer flange portions 62D. The front upright wall portion 62E inflects toward the upper side.

A rear upright wall portion 62F protrudes from rear ends of the upper wall portion 62A, the pair of side wall portions 62B and 62C and the pair of outer flange portions 62D. The rear upright wall portion 62F inflects toward the upper side. Upper ends of the front upright wall portion 62E and the rear upright wall portion 62F are formed in substantial hat shapes that open to the lower side in front view.

A front flange portion 62G protrudes from an upper end of the front upright wall portion 62E. The front flange portion 62G inflects toward the front side. A rear flange portion 62H protrudes from an upper end of the rear upright wall portion 62F. The rear flange portion 62H inflects toward the rear side. Specifically, the front flange portion 62G is structured by a front flange upper portion 62G1, front flange side portions 62G2 and front flange lower portions front flange lower portions 62G3. The front flange upper portion 62G1 is formed at the side of the tunnel lower reinforcement 62 at which the upper wall portion 62A is disposed. The front flange side portions 62G2 are respectively formed at the sides at which the side wall portions 62B and 62C are disposed. The front flange lower portions 62G3 are formed at the sides at which the outer flange portions 62D are disposed.

Meanwhile, the rear flange portion 62H is structured by a rear flange upper portion 62H1, rear flange side portions 62H2 and rear flange lower portions 62H3. The rear flange upper portion 62H1 is formed at the side of the tunnel lower reinforcement 62 at which the upper wall portion 62A is disposed. The rear flange side portions 62H2 are respectively formed at the sides at which the side wall portions 62B and 62C are disposed. The rear flange lower portions 62H3 are formed at the sides at which the outer flange portions 62D are disposed. The front flange lower portions 62G3 and the rear flange lower portions 62H3 are connected together by connecting flange portions 62J that are formed along the vehicle front-and-rear direction at distal ends of the protrusion directions of the outer flange portions 62D.

In the present exemplary embodiment, the front flange upper portion 62G1 and rear flange upper portion 62H1 of the tunnel lower reinforcement 62 are joined to the upper wall portion 36A of the tunnel 36. The front flange side portions 62G2 and rear flange side portions 62H2 of the tunnel lower reinforcement 62 are respectively joined to the pair of side wall portions 36B of the tunnel 36 at the aforementioned joining portions 41 and 43 (see FIG. 4). At the outer flange portions 62D of the tunnel lower reinforcement 62, the front flange lower portions 62G3, connecting flange portions 62J and rear flange lower portions 62H3 are joined to the outer flange portions 36C of the tunnel 36.

Thus, as shown in FIG. 5, a closed cross section portion 64 is formed between the upper wall portion 62A, pair of side wall portions 62B and 62C and pair of outer flange portions 62D of the tunnel lower reinforcement 62 and the upper wall portion 36A, pair of side wall portions 36B and outer flange portions 36C of the tunnel 36.

In this structure, the tunnel lower reinforcement 62 is disposed at a location that overlaps with the cross-members 58 in side view. As shown in FIG. 4 and FIG. 5, the front flange portion 58J of the cross-member 58 is joined together with one of the side wall portions 36B of the tunnel 36 and one of the front flange side portions 62G2 of the tunnel lower reinforcement 62 at the aforementioned joining portion 43. The rear flange portion 58K of the cross-member 58 is joined together with the side wall portion 36B of the tunnel 36 and one of the rear flange side portions 62H2 of the tunnel lower reinforcement 62 at the aforementioned joining portion 45.

The upper flange portion 58L of the cross-member 58 is joined together with the side wall portion 40B of the tunnel upper reinforcement 40, the side wall portion 36B of the tunnel 36 and the front flange side portion 62G2 of the tunnel lower reinforcement 62 at the joining portion 41. The upper flange portion 58L of the cross-member 58 is also joined together with the side wall portion 40B of the tunnel upper reinforcement 40, the side wall portion 36B of the tunnel 36 and the rear flange side portion 62H2 of the tunnel lower reinforcement 62 at the joining portion 45.

At the upper flange portion 58L of the cross-member 58, in addition to the joining portions 41 and 45, a joining portion 49 may be provided between the joining portion 41 and the joining portion 45. At the joining portions 49, the side wall portions 62B and 62C of the tunnel lower reinforcement 62 oppose the side wall portions 36B of the tunnel 36. Therefore, at the joining portion 49, the upper flange portion 58L of the cross-member 58 is joined to the side wall portion 40B of the tunnel upper reinforcement 40 and the side wall portion 36B of the tunnel 36. That is, the tunnel lower reinforcement 62 is not joined at the joining portions 49. Note that the joining portions 49 are not necessarily required.

—Operation and Effects of the Vehicle Floor Portion Structure—

Now, operation and effects of the vehicle floor portion structure according to the present exemplary embodiment are described.

As shown in FIG. 2 and FIG. 4, the tunnel lower reinforcement 62 is disposed in the tunnel 36. The closed cross section portion 64 is formed between the upper wall portion 62A, pair of side wall portions 62B and 62C, and pair of outer flange portions 62D of the tunnel lower reinforcement 62 and the upper wall portion 36A, pair of side wall portions 36B and outer flange portions 36C of the tunnel 36.

Thus, because the closed cross section portion 64 is formed between the tunnel lower reinforcement 62 and the tunnel 36, both stiffness of the tunnel lower reinforcement 62 may be improved and stiffness of the tunnel 36 may be improved.

The tunnel upper reinforcement 40 is provided above the tunnel 36. The tunnel upper reinforcement 40 overlaps with the cross-member 58 in side view and is joined together with the cross-member 58 (at the joining portions 41 and 45). The tunnel lower reinforcement 62 is provided in the tunnel 36. The tunnel lower reinforcement 62 overlaps with the cross-member 58 in side view and is joined together with the cross-member 58 (at the joining portions 41, 43, 45 and 47).

Because the plural members including the tunnel 36 and the cross-member 58 overlap and are joined in this manner, joining strengths may be improved at the joining portions 41, 43, 45 and 47 at which the cross-member 58 is joined to the tunnel 36. Thus, the joining portions 41, 43, 45 and 47 may be reinforced.

Therefore, bracing reaction forces of the tunnel 36 may be increased and a load transmission efficiency of the tunnel 36 may be improved. Consequently, during a side impact of the vehicle 12, as shown in FIG. 3, a collision load F that is transmitted from the rocker 28 to the cross-member 58 is transmitted to the tunnel upper reinforcement 40, the tunnel 36 and the tunnel lower reinforcement 62. Hence, the collision load F is efficiently transmitted through the tunnel upper reinforcement 40, the tunnel 36 and the tunnel lower reinforcement 62 to the opposite side thereof from the side at which the impact occurs (i.e., the side at which the cross-member 60 is disposed).

In the present exemplary embodiment, as shown in FIG. 3 and FIG. 4, because the tunnel upper reinforcement 40 and the tunnel lower reinforcement 62 are provided at the tunnel 36, the tunnel 36 is reinforced, in addition to which a collision load F may be dispersed into the tunnel upper reinforcement 40 and the tunnel lower reinforcement 62. Therefore, occurrences of locations of the tunnel 36 at which stresses concentrate may be suppressed.

For example, although not shown in the drawings, during a side impact of a vehicle, if a reaction force in a downward direction acts on an upper wall portion of a tunnel and buckling deformations of side wall portions of the tunnel occur, there may be separation at joining portions between the tunnel and a floor panel.

In the present exemplary embodiment, by contrast, the joining strengths of the joining portions 41, 43, 45 and 47 between the tunnel 36 and the cross-member 58 may be improved. In other words, the joining portions 41, 43, 45 and 47 may be reinforced, as a result of which the load transmission efficiency toward the opposite side from the side at which an impact occurs may be improved. Therefore, deformation of the floor panels 25 (cross-sectional crushing) may be suppressed, and separation of joining portions between the tunnel 36 and the floor panels 25 may be suppressed.

As shown in FIG. 5, in the present exemplary embodiment, the pair of side wall portions 62B and 62C of the tunnel lower reinforcement 62 are angled relative to one another towards the central side in the vehicle width direction of the tunnel lower reinforcement 62 towards the upper sides thereof, and the corner portions between the upper wall portion 62A and the side wall portion 62B and between the upper wall portion 62A and the side wall portion 62C are formed with radiuses of curvature that are as small as possible. Therefore, compared to a structure in which these corner portions are formed with larger radiuses of curvature, a collision load (F1, which is smaller than F) that is transmitted from the cross-member 58 through the tunnel 36 to the tunnel lower reinforcement 62 is smoothly transmitted to the side wall portion 62B, the upper wall portion 62A and the side wall portion 62C.

—Variant Examples of the Present Exemplary Embodiment—

In the present exemplary embodiment, as shown in FIG. 5, the tunnel lower reinforcement 62 is formed in a substantial hat shape that opens to the lower side in front view. That is, the tunnel lower reinforcement 62 is formed as an "open cross section". However, this is not limiting.

Figure 6:
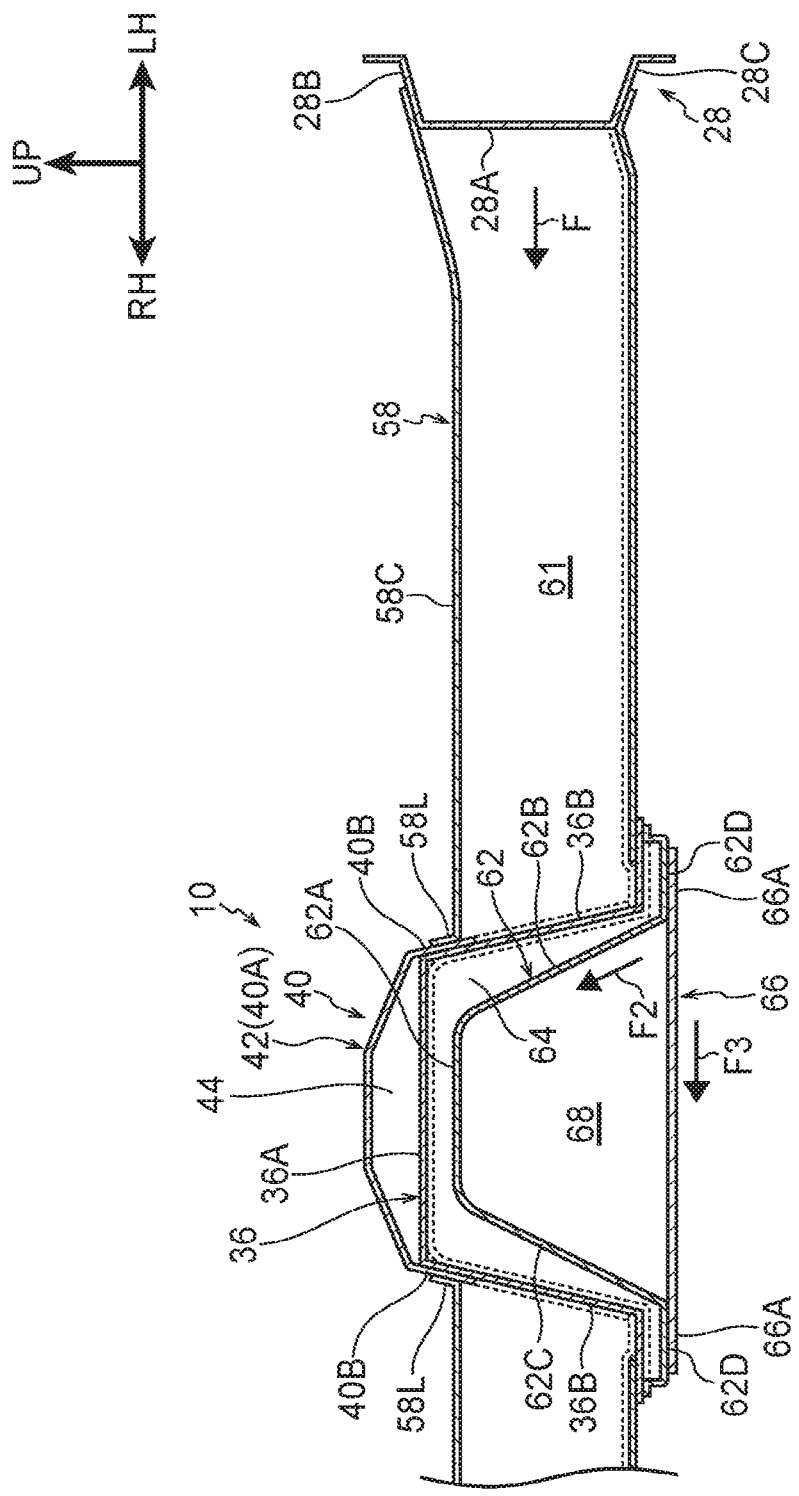
FIG. 6 is a sectional diagram, corresponding to FIG. 5, showing a variant example of the vehicle floor portion structure in accordance with the present exemplary embodiment.

For example, as shown in FIG. 6, a reinforcing plate 66 that opposes the tunnel lower reinforcement 62 may be disposed at the lower side of the tunnel lower reinforcement 62. In this structure, the reinforcing plate 66 is formed in a substantially rectangular shape in plan view, and each of two end portions 66A of the vehicle width direction of the reinforcing plate 66 is joined to the respective outer flange portion 62D of the tunnel lower reinforcement 62. The tunnel lower reinforcement 62 is formed into a "closed cross section" by this joining of the reinforcing plate 66, with a closed cross section portion 68 being formed between the tunnel lower reinforcement 62 and the reinforcing plate 66.

Thus, both the stiffness of the tunnel lower reinforcement 62 itself may be improved and the stiffness of the tunnel 36 may be improved. Moreover, a collision load (which is smaller than F) that is transmitted from the cross-member 58 through the tunnel 36 to the tunnel lower reinforcement 62 may also be dispersed into the reinforcing plate 66 (loads F2 and F3). Herein, the term "open cross section" refers to a state in which an opening portion is opened up at the lower side of the tunnel lower reinforcement 62, and the term "closed cross section" refers to a state in which the opening portion is closed up. Although the reinforcing plate 66 is disposed substantially along a horizontal direction in this structure, the reinforcing plate 66 may be formed so as to avoid interference with an exhaust pipe, which is not shown in the drawings.

In the present exemplary embodiment, the cross-member 58 is arranged such that the ridgeline S of the cross-member 58 is at substantially the same position in the vehicle front-and-rear direction as the ridgeline P formed at the upper wall portion 40A of the tunnel upper reinforcement 40. Therefore, load transmission paths may be increased by the ridgeline S of the cross-member 58 being formed to be continuous in the vehicle width direction with the ridgeline P of the tunnel upper reinforcement 40. However, this structure is not necessarily required. It is sufficient that the cross-member 58 partially overlaps with the tunnel upper reinforcement 40 in side view and is joined together with the tunnel upper reinforcement 40. Therefore, the location of the cross-member 58 in the front-and-rear direction may be modified.

In the present exemplary embodiment, the closed cross section portion 64 is formed between the upper wall portion 62A, pair of side wall portions 62B and 62C and pair of outer flange portions 62D of the tunnel lower reinforcement 62 and the upper wall portion 36A, pair of side wall portions 36B and outer flange portions 36C of the tunnel 36. However, it is sufficient that the closed cross section portion 64 is formed between the tunnel lower reinforcement 62 and the upper wall portion 36A and pair of side wall portions 36B of the tunnel 36. Therefore, the outer flange portions 62D may be joined directly to the outer flange portions 36C of the tunnel 36. Note that in this case the front upright wall portion 62E and rear upright wall portion 62F are not formed at the outer flange portions 62D.

In the present exemplary embodiment, as shown in FIG. 5, the closed cross section portion 61 is formed between the cross-member 58 and the floor panel 25, but the shape of the cross-member 58 is not limited thus. For example, in a case of using the same material, if reducing weight is not a concern, then a solid member may be employed, which is not shown in the drawings.

Hereabove, the present disclosure has been described in accordance with the exemplary embodiment, but the present disclosure is not limited by this exemplary embodiment. The exemplary embodiment and various variant examples may be used in suitable combinations, and it will be clear that numerous modes may be embodied within a technical scope not departing from the gist of the present disclosure.

What is claimed is:

1. A vehicle floor portion structure comprising:
   a pair of rockers disposed at each of two outer sides in a vehicle width direction of a floor panel of a vehicle, the rockers extending in a vehicle front-and-rear direction;
   a tunnel disposed at a central portion in the vehicle width direction of the floor panel, the tunnel protruding to a vehicle cabin interior side and extending in the vehicle front-and-rear direction, and the tunnel including
      a first upper wall portion that structures a top portion, and
      a pair of first side wall portions that connect with the first upper wall portion and are disposed to oppose one another in the vehicle width direction;
   cross-members of which second upper wall portions structuring a top portion thereof that link the rockers with the tunnel in the vehicle width direction;
   a tunnel upper reinforcement provided above the tunnel, the tunnel upper reinforcement partially overlapping with the second upper wall portions of the cross-members in side view and being joined together with the cross-members; and
   a tunnel lower reinforcement disposed in the tunnel, a closed cross section portion being formed between the tunnel lower reinforcement and the first upper wall portion and the pair of first side wall portions, and the tunnel lower reinforcement overlapping with the cross-members in side view and being joined together with the cross-members, wherein the second upper wall portions link the rockers with the tunnel at a height overlapping with the tunnel upper reinforcement.

2. The vehicle floor portion structure according to claim 1, wherein each cross-member includes an upper flange portion that protrudes toward the upper side in a vehicle up-and-down direction from an end portion of the second upper wall portion at the side thereof at which the tunnel is disposed, second side wall portions structure portions of the tunnel upper reinforcement and abut against the first side wall portions of the tunnel from the outer sides of the tunnel in the tunnel width direction, and the upper flange portions overlap with the second side wall portions and the first side wall portions in side view and are joined together with the second side wall portions and the first side wall portions.

3. The vehicle floor portion structure according to claim 2, wherein the each cross-member further includes:

a first front wall portion that connects with the second upper wall portion and is disposed at the front side of the second upper wall portion in the vehicle front-and-rear direction;

a first front flange portion protruding toward the front side in the vehicle front-and-rear direction from an end portion of the first front wall portion at the side thereof at which the tunnel is disposed;

a first rear wall portion that connects with the second upper wall portion and is disposed at the rear side of the second upper wall portion in the vehicle front-and-rear direction; and a first rear flange portion protruding toward the rear side in the vehicle front-and-rear direction from an end portion of the first rear wall portion at the side thereof at which the tunnel is disposed, the tunnel lower reinforcement includes:

a third upper wall portion that structures a top portion of the tunnel lower reinforcement and is disposed at the lower side in the vehicle up-and-down direction of the first upper wall portion of the tunnel;

a pair of third side wall portions that connect with the third upper wall portion and are disposed at respective inner sides in the vehicle width direction of the first side wall portions of the tunnel;

a front upright wall portion provided at front end portions in the vehicle front-and-rear direction of the pair of third side wall portions;

second front flange portions that are formed at the third side wall portions via the front upright wall portion, each second front flange portion protruding toward the front side in the vehicle front-and-rear direction;

a rear upright wall portion provided at rear end portions in the vehicle front-and-rear direction of the pair of third side wall portions; and second rear flange portions that are formed at the third side wall portions via the rear upright wall portion, each second rear flange portion protruding toward the rear side in the vehicle front-and-rear direction, the first front flange portions overlap with the first side wall portions and the second front flange portions in side view and are joined together with the first side wall portions and the second front flange portions, and the first rear flange portions overlap with the first side wall portions and the second rear flange portions in side view and are joined together with the first side wall portions and the second rear flange portions.

4. The vehicle floor portion structure according to claim 1, wherein the pair of side wall portions and of the tunnel lower reinforcement are angled relative to one another towards the central side in the vehicle width direction of the tunnel lower reinforcement towards the upper sides thereof, and corner portions between the upper wall portion and the side wall portion and between the upper wall portion and the side wall portion are formed with small radiuses of curvature in a cross section cut along the vehicle width direction.

5. The vehicle floor portion structure according to claim 1, further comprising a reinforcing plate disposed at the lower side of the tunnel lower reinforcement to oppose the tunnel lower reinforcement.

6. The vehicle floor portion structure according to claim 5, wherein the reinforcing plate is formed in a substantially rectangular shape in plan view, and each of two end portions of the vehicle width direction of the reinforcing plate is joined to the respective outer flange portion of the tunnel lower reinforcement.

* * * * *